(12) United States Patent
Jiang et al.

(10) Patent No.: US 12,244,822 B2
(45) Date of Patent: Mar. 4, 2025

(54) METHOD FOR ACQUIRING MOTION VECTORS, PREDICTION METHOD AND DEVICE

(71) Applicant: ZHEJIANG DAHUA TECHNOLOGY CO., LTD., Hangzhou (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEIJIANG DAHUA TECHNOLOGY CO., LTD., Hangzhou (CN)

( * ) Notice: Subject to any disclaimer, the term of this patent is extended or adjusted under 35 U.S.C. 154(b) by 416 days.

(21) Appl. No.: 17/696,854

(22) Filed: Mar. 16, 2022

(65) Prior Publication Data
US 2022/0210436 A1 Jun. 30, 2022

Related U.S. Application Data

(63) Continuation of application No. PCT/CN2020/116274, filed on Sep. 18, 2020.

(30) Foreign Application Priority Data
Sep. 18, 2019 (CN) .......................... 201910883007.5

(51) Int. Cl.
*H04N 19/147* (2014.01)
*H04N 19/105* (2014.01)
(Continued)

(52) U.S. Cl.
CPC ......... *H04N 19/147* (2014.11); *H04N 19/105* (2014.11); *H04N 19/176* (2014.11); *H04N 19/52* (2014.11)

(58) Field of Classification Search
CPC .... H04N 19/176; H04N 19/105; H04N 19/52; H04N 19/577; H04N 19/137;
(Continued)

(56) References Cited

U.S. PATENT DOCUMENTS 8,929,675 B2 * 1/2015 Ono .................. H04N 5/21
382/254
2008/0101472 A1 * 5/2008 Jeon ................... H04N 19/513
375/E7.113
(Continued)

FOREIGN PATENT DOCUMENTS

CN 1578469 A 2/2005
CN 1992789 A 7/2007
(Continued)

OTHER PUBLICATIONS

European Search Report, EP 20866414.4, mailed Nov. 16, 2022(9 pages).
(Continued)

*Primary Examiner* — Daniel Chang

(57) ABSTRACT

A method for acquiring motion vectors includes: obtaining a number of related motion vectors of a current block, wherein the number of related motion vectors are motion vectors of a related block of the current block, a prediction mode of the related block is the same as a current prediction mode of the current block, an encoding has been completed; determining weights of at least part of the number of related motion vectors; and calculating a weighted motion vector of the current block based on at least part of the number of related motion vectors and the weights of at least part of the plurality of related motion vectors.

14 Claims, 7 Drawing Sheets

(51) Int. Cl.
*H04N 19/176* (2014.01)
*H04N 19/52* (2014.01)

(58) Field of Classification Search
CPC .... H04N 19/61; H04N 19/513; H04N 19/593; H04N 19/139; H04N 19/159; G06T 9/004
See application file for complete search history.

(56) References Cited

U.S. PATENT DOCUMENTS

| | | | |
|---|---|---|---|
| 2010/0183075 A1* | 7/2010 | Furukawa | H04N 19/58 375/E7.123 |
| 2010/0322315 A1* | 12/2010 | Hasuo | H04N 19/70 375/E7.104 |
| 2011/0243231 A1* | 10/2011 | Li | H04N 19/433 375/E7.256 |
| 2012/0307903 A1* | 12/2012 | Sugio | H04N 19/56 375/240.26 |
| 2013/0050254 A1* | 2/2013 | Tran | H04N 19/103 345/629 |
| 2013/0083851 A1* | 4/2013 | Alshin | H04N 19/537 375/240.14 |
| 2014/0294312 A1* | 10/2014 | Sato | H04N 19/86 382/238 |
| 2015/0131728 A1* | 5/2015 | Wang | H04N 19/513 375/240.16 |
| 2015/0131731 A1* | 5/2015 | Kim | H04N 5/21 375/240.16 |
| 2015/0131732 A1* | 5/2015 | Kim | H04N 19/57 375/240.16 |
| 2015/0181219 A1* | 6/2015 | Lin | H04N 19/567 375/240.16 |
| 2015/0350671 A1* | 12/2015 | Alshin | H04N 19/13 375/240.15 |
| 2017/0214938 A1* | 7/2017 | Zhang | H04N 19/177 |
| 2018/0041768 A1* | 2/2018 | Koo | H04N 19/119 |
| 2018/0131943 A1 | 5/2018 | Park et al. | |
| 2018/0309990 A1* | 10/2018 | Alshina | H04N 19/537 |
| 2018/0343448 A1* | 11/2018 | Possos | H04N 19/176 |
| 2018/0376165 A1* | 12/2018 | Alshin | H04N 19/577 |
| 2019/0174136 A1* | 6/2019 | Jun | H04N 19/176 |
| 2019/0297325 A1* | 9/2019 | Lim | H04N 19/13 |
| 2019/0313103 A1* | 10/2019 | Giladi | H04N 19/517 |
| 2020/0029088 A1* | 1/2020 | Xu | H04N 19/105 |
| 2020/0029090 A1* | 1/2020 | Alshin | H04N 19/159 |
| 2020/0374540 A1* | 11/2020 | Wang | H04N 19/157 |
| 2020/0396462 A1* | 12/2020 | Zhang | H04N 19/61 |
| 2022/0182614 A1* | 6/2022 | Jang | H04N 19/11 |
| 2022/0210436 A1* | 6/2022 | Jiang | H04N 19/503 |

FOREIGN PATENT DOCUMENTS

| | | | |
|---|---|---|---|
| CN | 101686393 A | 3/2010 | |
| CN | 103561263 A | 2/2014 | |
| CN | 103607590 A | 2/2014 | |
| CN | 109196864 A | 1/2019 | |
| CN | 109963155 A | 7/2019 | |
| CN | 110213590 A | 9/2019 | |
| CN | 110225346 A | 9/2019 | |
| CN | 110636311 A | 12/2019 | |
| KR | 20030073100 A | 9/2003 | |
| WO | WO2018084339 A1 | 5/2018 | |
| WO | WO2019045398 A1 | 3/2019 | |
| WO | WO-2019119909 A1 * | 6/2019 | ........... H04N 19/105 |

OTHER PUBLICATIONS

Notice of First Examination Opinion.
Search Report.
Notice of Registration Procedures.
Zhao, Liang et al. Non-CE: Weighted intra and inter prediction mode, Joint Video Experts Team (JVET) ofITU-T SG 16 WP 3 and ISO/IEC JTC 1/SC 29/WG 11 15th Meeting: Gothenburg, SE, Jul. 3-12, 2019 Jul. 12, 2019(Jul. 12, 2019) the whole document.

* cited by examiner

METHOD FOR ACQUIRING MOTION VECTORS, PREDICTION METHOD AND DEVICE

CROSS REFERENCE

The present application is a continuation-application of International (PCT) Patent Application No. PCT/CN2020/116274, filed on Sep. 18, 2020, which claims foreign priority of Chinese Patent Applications No. 201910883007.5, filed on Sep. 18, 2019, in the China National Intellectual Property Administration (CNIPA), the entire contents of which are hereby incorporated by reference.

TECHNICAL FIELD

The present disclosure relates to the field of video encoding and decoding, and particularly to a method for acquiring motion vectors, a prediction method and a device.

BACKGROUND

Due to a large amount of video image data, a video pixel data (such as RGB, YUV, etc.) is usually required to be encoded and compressed to reduce the amount of video data, thereby reducing a bandwidth required during transmission, and reducing a storage space required for the video.

The entire video encoding process includes acquisition, prediction, transformation, quantization, entropy coding and etc. The prediction often includes an inter-frame prediction to remove a temporal redundancy of video images. Typically, the prediction includes an intra-frame prediction, an intra-frame block copy prediction, and the inter-frame prediction to remove a spatial redundancy and the temporal redundancy of video images, respectively.

At present, motion vectors (MV) are configured in the intra-frame block copy prediction and the inter-frame prediction. Both are configured to search a reference frame of a current block for a block that most closely matches the current block to predict the current block. The reference frame in the intra-frame block copy prediction is a current frame. Whether the intra-frame block copy prediction or the inter-frame mode is configured, a main purpose is to predict a final motion vector of the current block, and then encode based on the final motion vector. Therefore, if the prediction is of low accuracy, an encoding compression rate may be affected. In view of this, how to improve the accuracy of prediction has become an urgent problem.

SUMMARY

The present disclosure provides a method for acquiring motion vectors, including: obtaining a plurality of related motion vectors of a current block, wherein the plurality of related motion vectors are motion vectors of a related block of the current block, a prediction mode of the related block is the same as a current prediction mode of the current block, an encoding has been completed; determining weights of at least part of the plurality of related motion vectors; and calculating a weighted motion vector of the current block based on at least part of the plurality of related motion vectors and the weights of at least part of the plurality of related motion vectors.

The present disclosure provides a motion vector-based prediction method, including: obtaining a weighted motion vector of a current block obtained through the method as described above; calculating a first coding cost of the current block based on the weighted motion vector; calculating a second encoding cost of the current block based on a motion vector different from the weighted motion vector, and selecting a motion vector corresponding to a smallest one of the first encoding cost and the second encoding cost to obtain a final motion vector of the current block.

The present disclosure provides a device for acquiring motion vectors, including a memory and a processor coupled to each other; wherein the processor is configured to execute program instructions stored in the memory to implement the method as described above.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

Figure 1:
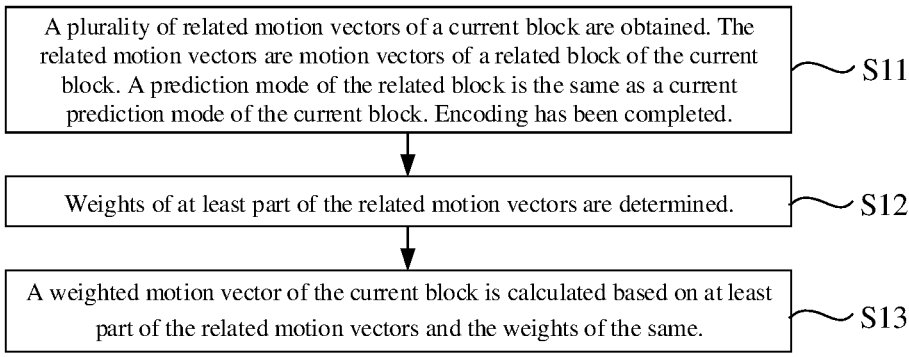
FIG. 1 is a schematic flowchart of a method for acquiring motion vectors according to an embodiment of the present disclosure.

To make any one of skill in the art to understand the technical solutions of the present disclosure, the present disclosure will be described in detail by referring to the drawings and the embodiments. Obviously, the described embodiments are only a part of the embodiments of the present disclosure, not all of the embodiments. Based on the embodiments in the present disclosure, all other embodiments obtained by those of ordinary skills in the art without creative efforts shall fall within the scope of the present disclosure.

Terms of "first", "second", "third" and the like in the present disclosure are for descriptions only and should not be interpreted as indicating or implying relative importance or implicitly indicating the number of technical features. Therefore, at least one of features defined as "first", "second", "third" and the like may be explicitly or implicitly included. In the description of the present disclosure, terms of "a plurality" refer to a number of at least two, for example, two, three, etc., unless it is specifically defined. All directional indications (such as up, down, left, right, front, back, etc.) in the embodiments of the present disclosure are only to explain relative positional relationship, movements and the like among components in a specific status (as shown in the drawings). If the specific status changes, the directional indications may change accordingly. Furthermore, terms of "include", "comprise" and any variations thereof are intended to cover non-exclusive inclusion. For example, a process, method, system, product, or device including a series of operations or units is not limited to the listed operations or units, but alternatively also includes operations or units that are not listed, or alternatively also includes other operations or units inherent to the process, method, system, product or device.

As for "embodiments" herein, particular features, structures, or characteristics described in connection with the embodiments may be included in at least one embodiment of the present disclosure. The appearances of this phrase in various places in the specification are neither necessarily all referring to the same embodiment, nor independent or alternative embodiments that are mutually exclusive with other embodiments. It is clearly and implicitly understood by those of ordinary skills in the art that the embodiments described herein may be combined with other embodiments. It should be noted that, for following method embodiments, if results are substantially the same, the methods of the present disclosure are not limited to the sequence of the illustrated processes.

For ease of description, the multiple prediction modes mentioned below will be introduced.

First, a Conventional Merge Prediction Mode

In the conventional Merge prediction mode, a method of constructing a motion vector candidate list is as follows.

Figure 4:
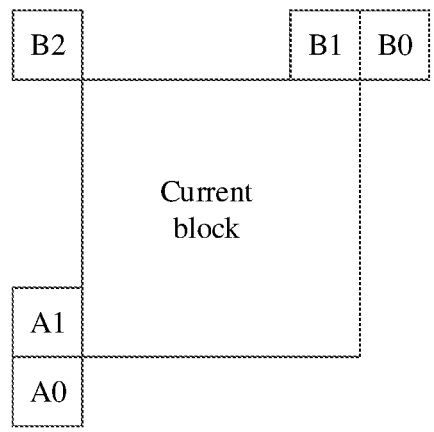
FIG. 4 is a schematic view of a position relationship between a current block and a spatial block in a method for acquiring motion vectors according to an embodiment of the present disclosure.

The motion vector candidate list of the conventional Merge prediction mode includes 6 candidate motion vectors. A maximum of 4 candidate motion vectors may be obtained from a spatial domain. As shown in FIG. 4, FIG. 4 is a schematic view of a position relationship between a current block and a spatial block in a method for acquiring motion vectors according to an embodiment of the present disclosure. A default acquisition order of spatial motion vector candidates is A1->B1->B0->A0 (->B2). Motion vectors of B2 may be obtained only in response to at least one of the A1, B1, B0, and A0 not existing and the motion vectors of B2 being different from those of A1 and B1.

Figure 5:
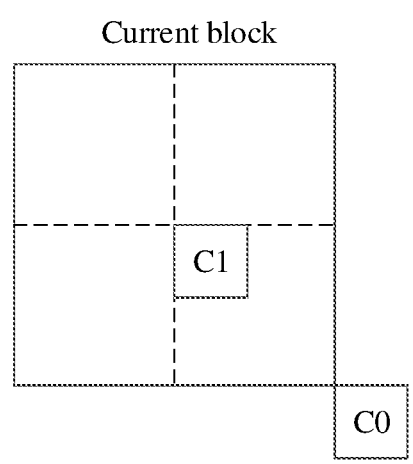
FIG. 5 is a schematic view of a position relationship between a current block and a temporal block in a method for acquiring motion vectors according to an embodiment of the present disclosure.
Figure 6:
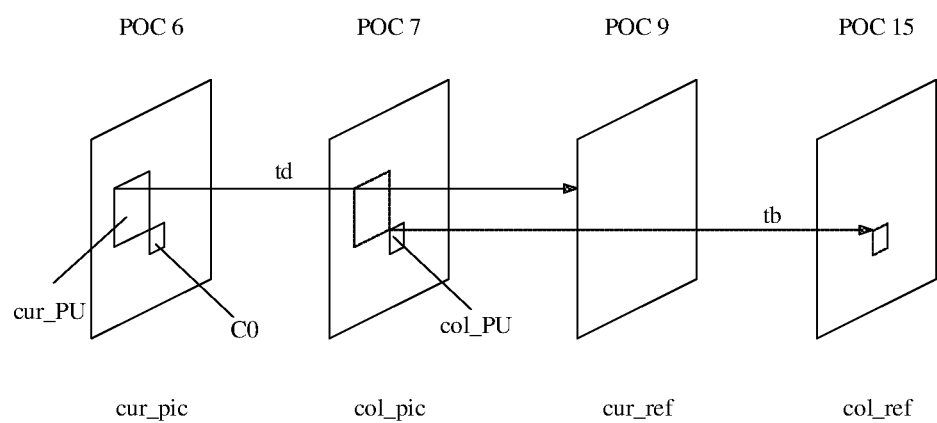
FIG. 6 is a scaled schematic view of temporal motion vectors in a method for acquiring motion vectors according to an embodiment of the present disclosure.

In response to the motion vector candidate list being unable to be filled with the spatial motion vector candidates, and a size of the current block being larger than 4×4, 8×4, and 4×8, the temporal motion vectors are required to be filled into the motion vector candidate list. Motion vectors of a co-located block in a co-located frame of a current frame may be scaled, such that temporal motion vectors of the current block are obtained. As shown in FIG. 5 and FIG. 6, a block at the C0 position in the current frame is a candidate position of the co-located block. Correspondingly, a block col_PU in a same spatial position as the C0 in the co-located frame is a co-located block. In this way, motion vectors in the co-located block are obtained, a distance between the current frame and a reference frame of the current frame is obtained, a distance between the co-located frame and a reference frame of the co-located frame is obtained to scale the motion vectors of the co-located block and obtain the temporal motion vectors of the current block. Specifically, the following formula may be a reference to obtain the temporal motion vectors of the current block.

$$curMV=(td/tb)*colMV$$

where cur_PU represents the current block, col_PU represents the co-located block, curMV represents the temporal motion vectors of the current block, colMV represents the temporal motion vectors of the co-located block, td represents the distance between the current frame (cur_pic) and the reference frame (cur_ref) of the current frame, tb represents the distance between the co-located frame (col_pic) and the reference frame (col_ref) of the co-located frame. In some embodiments, in response to the co-located block at the C0 position in FIG. 5 being unavailable, the co-located block at the C1 position may be replaced.

In response to the Merge motion vector candidate list not being full, motion vectors in a coded block history-based motion vector prediction (HMVP) list are compared with the motion vectors of the spatial domains A1 and B1 in order. Different motion vectors are filled in the candidate list until the candidate list is full.

In response to the Merge motion vector candidate list not being full, the first two motion vectors in the Merge motion vector candidate list are configured for averaging (that is, forward motion vectors are configured for averaging, and backward motion vectors are configured for averaging). A final average value is filled into the Merge motion vector candidate list.

In response to the Merge motion vector candidate list not being full, zero motion vectors are configured for filling to a specified number.

Second, a Conventional Advanced Motion Vector Prediction (AMVP) Mode

In the conventional AMVP mode, the motion vector candidate list has a length of 2. The motion vector candidate list may be created for each reference frame in the following order until there are 2 motion vectors in the candidate list.

The motion vector candidate list of AMVP includes 2 candidate motion vectors.

Therefore, a candidate motion vector is obtained at each of a left boundary and an upper boundary of the current block as a spatial candidate motion vector and added to the motion vector candidate list. A default acquisition order of the candidate motion vectors on the left boundary is A0->A1->scaled A0->scaled A1. A default acquisition order of the candidate motion vectors on the upper boundary is B0->B1->B2 (->scaled B0->scaled B1->scaled B2). In response to the left boundary (or upper boundary) detecting a first available candidate motion vector, the candidate motion vector is added to the motion vector candidate list as a spatial candidate motion vector, and no other candidate motion vectors for the left boundary (or upper boundary) are checked.

In response to a size of the current block being larger than 4×4, 8×4, and 4×8, temporal motion vectors are required to be added. Only one candidate motion vector can be provided in the temporal domain. As shown in FIGS. 5 and 6, the block at the C0 position in the current frame is a candidate position for the co-located block. Correspondingly, the block col_PU in the same spatial position as C0 in the co-located frame is a co-located block. In this way, motion vectors in the co-located block are obtained, a distance between the current frame and a reference frame of the current frame is obtained, a distance between the co-located frame and a reference frame of the co-located frame is obtained to scale the motion vectors of the co-located block and obtain the temporal motion vectors of the current block. Specifically, the following formula may be a reference to obtain the temporal motion vectors of the current block.

$$curMV=(td/tb)*colMV$$

where cur_PU represents the current block, col_PU represents the co-located block, curMV represents the temporal motion vectors of the current block, colMV represents the temporal motion vectors of the co-located block, td represents the distance between the current frame (cur_pic) and the reference frame (cur_ref) of the current frame, tb represents the distance between the co-located frame (col_pic) and the reference frame (col_ref) of the co-located frame. In some embodiments, in response to the co-located block at the C0 position in FIG. 5 being unavailable, the co-located block at the C1 position may be replaced.

In response to the motion vector candidate list not being full, motion vectors are required to be filled in a coded block HMVP list. The coded block here refers to a coded inter-frame block in a current collect transfer unit (CTU). A reference frame of the current block and that of the coded block is a same frame. Latest 4 motion vectors in the coded block motion vector list are filled into the candidate list until the candidate list is full.

In response to the motion vector candidate list not being full, all remaining motion vectors in the candidate list are filled with zero motion vectors.

Third, Merge_IBC (Merge Intra Block Copy) Mode

A motion vector candidate list of the Merge_IBC mode includes a maximum of 6 candidate motion vectors. The specific process is described as follows.

A positional relationship between a current block and an adjacent block can be shown in FIG. 4. In cases of the adjacent block being an IBC block (that is, the mode is Merge_IBC or AMVP_IBC), motion vectors of the adjacent block are filled into the candidate list according to a sequence of A1B1 until the candidate list is full.

In response to the motion vector candidate list not being full, the motion vectors in the coded block HMVP list are sequentially compared with the motion vectors of the spatial domains A1 and B1. Different motion vectors are filled into the candidate list until the candidate list is full.

In response to the motion vector candidate list not being full, all remaining motion vectors in the candidate list are filled with zero motion vectors.

Fourth, AMVP_IBC mode.

A motion vector candidate list of the AMVP_IBC mode includes 2 candidate motion vectors. The specific process is described as follows.

A positional relationship between a current block and an adjacent block can be shown in FIG. 4. In cases of the adjacent block being an IBC block (that is, the mode is Merge_IBC or AMVP_IBC), motion vectors of the adjacent block are filled into the candidate list according to a sequence of A1B1 until the candidate list is full.

In response to the motion vector candidate list not being full, the motion vectors in the coded block HMVP list are sequentially compared with the motion vectors of the spatial domains A1 and B1. Different motion vectors are filled into the candidate list until the candidate list is full.

In response to the motion vector candidate list not being full, all remaining motion vectors in the candidate list are filled with zero motion vectors.

In some embodiments, referring to FIG. 1, FIG. 1 is a schematic flowchart of a method for acquiring motion vectors according to an embodiment of the present disclosure. Specifically, the operations as illustrated in blocks shown in FIG. 1 may be included.

At block S11: A plurality of related motion vectors of a current block are obtained. The related motion vectors are motion vectors of a related block of the current block. A prediction mode of the related block is the same as a current prediction mode of the current block. Encoding has been completed.

In the embodiments, the current block is a block to be encoded. In some embodiments, the related block may include a temporal related block, may also include a spatial related block, and may also include a temporal related block and a spatial related block, which are not limited herein. In cases of the related block being a temporal related block, the corresponding related motion vectors are temporal motion vectors. In cases of the related block being a spatial related block, the corresponding related motion vectors are spatial motion vectors.

As mentioned above, the current prediction mode of the current block may be an inter-frame prediction mode, such as: the conventional Merge mode, the conventional AMVP mode. The current prediction mode of the current block may also be an intra-frame block copy mode, such as the Merge_IBC mode, the AMVP_IBC Mode. In the embodiments, the prediction mode of the related block is the same as the current prediction mode of the current block. Therefore, in response to the current prediction mode of the current block being an inter-frame prediction mode, the prediction mode of the related block should also be an inter-frame prediction mode. In response to the current prediction mode of the current block being an intra-frame block copy mode, the prediction mode of the related block should also be an intra-frame block copy mode. For example, in response to the current prediction mode of the current block being the conventional Merge mode, the prediction mode of the related block may be the conventional Merge mode or the conventional AMVP mode. In response to the current prediction mode of the current block being the Merge_IBC mode, the prediction mode of the related block may be the Merge_IBC mode or the AMVP_IBC mode. In response to the current prediction mode of the current block being another mode, the prediction mode of the related block may be configured by analogy, and the embodiments will not be exemplified one by one here. Therefore, the method for acquiring motion vectors in the embodiments can be applied to all existing modes of motion vector prediction, having a good compatibility. In some embodiments, in response to the prediction mode of the current block being the intra-frame block copy mode, and the current block includes only a spatial related block, then the corresponding related motion vectors are spatial motion vectors.

In addition, in the embodiments, the related block has been encoded. That is, the related block includes determined motion vectors, and motion vectors of the related block are motion vectors (that is, the related motion vectors) configured when encoding.

At block S12: Weights of at least part of the related motion vectors are determined.

In some embodiments, in cases of the related block being a temporal related block, the temporal related block does not belong to a current frame in which the current block is located. A weight determination strategy matching the temporal related block may be configured to determine the weights of the related motion vectors. The weight determination strategy matching the temporal related block is related to time factors, and the specific strategy is not limited herein.

In other embodiments, in cases of the related block being a spatial related block, a weight determination strategy matching the spatial related block may be configured to determine the weights of the related motion vectors. The weight determination strategy matching the spatial related block is related to spatial factors, and the specific strategy is not limited herein. In addition, the spatial related block belongs to a current frame in which the current block is located. The spatial related block is located on an encoded side of the current block.

In other embodiments, in cases of the related block including both the temporal related block and the spatial related block, a weight determination strategy matching the temporal related block may be configured to determine the weights of the temporal motion vectors, and a final temporal motion vector is calculated based on the weights. At the same time, a weight determination strategy matching the spatial related blocks is configured to determine the weights of the spatial motion vectors, and a final spatial motion vector is calculated based on the weights. Weights of the final temporal motion vector and the final spatial motion vector are determined, respectively.

At block S13: A weighted motion vector of the current block is calculated based on at least part of the related motion vectors and the weights of the same.

In some embodiments, in response to the related block being a temporal related block and a sum of the weights being equal to 1, the temporal motion vectors and the weights of the same may be configured to perform a weighted sum operation to obtain a weighted motion vector of the current block. Or, in response to the related block being a temporal related block and a sum of the weights not being equal to 1, the temporal motion vectors and the weights of the same may be configured to perform a weighted average operation to obtain a weighted motion vector of the current block.

In other embodiments, in response to the related block being a spatial related block and a sum of the weights being equal to 1, the spatial motion vectors and the weights of the same may be configured to perform a weighted sum operation to obtain a weighted motion vector of the current block. Or, in response to the related block being a spatial related block and a sum of the weights not being equal to 1, the spatial motion vectors and the weights of the same may be configured to perform a weighted average operation to obtain a weighted motion vector of the current block.

In other embodiments, in cases of the related block including both the spatial related block and the temporal related block, a weight determination strategy matching the spatial related block may be configured to determine the weights of the spatial motion vectors, and a final spatial motion vector is calculated based on the weights. At the same time, a weight determination strategy matching the temporal related blocks is configured to determine the weights of the temporal motion vectors, and a final temporal motion vector is calculated based on the weights. Weights of the final temporal motion vector and the final spatial motion vector are determined, respectively.

In the above embodiments, a plurality of related motion vectors of a current block are obtained. The related motion vectors are motion vectors of a related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

In some embodiments, in cases of the related motion vectors including spatial motion vectors, the weights of at least part of the related motion vectors may be determined based on at least one of a size of the current block, content characteristics of the current block, and a position of the spatial related block relative to the current block.

Figure 2:
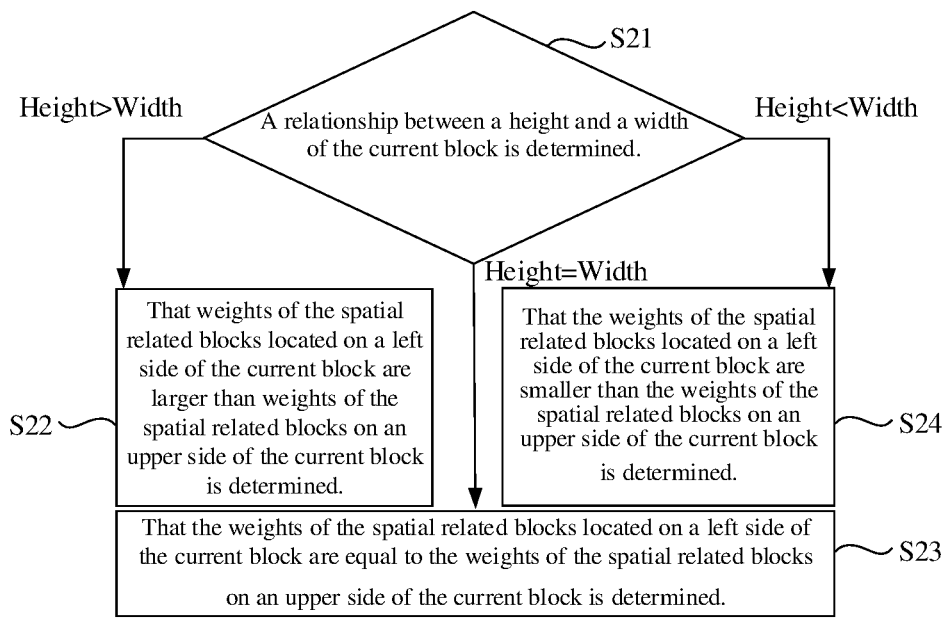
FIG. 2 is a schematic flowchart of block S12 in FIG. 1 according to an embodiment of the present disclosure.

Specifically, in cases of determining the weights of at least part of the related motion vectors based on the size of the current block, the weights of the spatial motion vectors may be determined based on the size of the current block, as shown in FIG. 2. FIG. 2 is a schematic flowchart of block S12 in FIG. 1 according to an embodiment of the present disclosure. Followed operations as illustrated in blocks shown in FIG. 2 may be included.

At block S21: A relationship between a height and a width of the current block is determined. In cases of the height being larger than the width, block S22 is performed. In cases of the height being equal to the width, block S23 is performed. In cases of the height being smaller than width, block S24 is performed.

Figure 3:
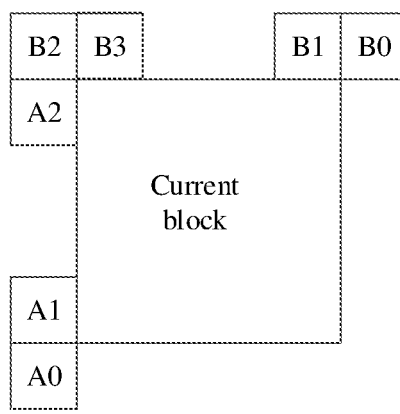
FIG. 3 is a schematic view of a position relationship between a current block and an adjacent block in a method for acquiring motion vectors according to an embodiment of the present disclosure.

Referring to FIG. 3, FIG. 3 is a schematic view of a position relationship between a current block and an adjacent block in a method for acquiring motion vectors according to an embodiment of the present disclosure. The size of the current block is a*b. Blocks at seven positions: A0, A1, A2, B0, B1, B2, and B3 are selected as adjacent blocks of the current block. In cases of only the blocks at A1, A2, B1 and B2 having been encoded, and A1 and B1 being inter-frame blocks, A2 and B2 being intra-frame copy blocks, in response to the current block being an inter-frame block, A1 and B1 are selected as the spatial related blocks of the current block; in response to the current block being an intra-frame copy block, A2 and B2 are selected as the spatial related blocks of the current block, which is not specifically limited herein.

A selection of A1 and B1 as the spatial related blocks of the current block is taken as an example. The relationship between the width a and the height b of the current block is determined. In response to b>a, block S22 is performed; b=a, block S23 is performed; b<a, block S24 is performed.

At block S22: That weights of the spatial related blocks located on a left side of the current block are larger than weights of the spatial related blocks on an upper side of the current block is determined.

In cases of the height being larger than the width, that the weights of the spatial related blocks located on a left side of the current block are larger than the weights of the spatial related blocks on an upper side of the current block is determined. That is, the weight of the A1 block is larger than the weight of the B1 block is determined. For example, the weight of the A1 block is 0.6, and the weight of the B1 block is 0.4, which is not specifically limited herein.

At block S23: That the weights of the spatial related blocks located on a left side of the current block are equal to the weights of the spatial related blocks on an upper side of the current block is determined.

In cases of the height being equal to the width, that the weights of the spatial related blocks located on a left side of the current block are equal to the weights of the spatial related blocks on an upper side of the current block is determined. That is, the weight of the A1 block is equal to the weight of the B1 block is determined. For example, the weight of the A1 block is 0.5, and the weight of the B1 block is 0.5, which is not specifically limited herein.

At block S24: That the weights of the spatial related blocks located on a left side of the current block are smaller than the weights of the spatial related blocks on an upper side of the current block is determined.

In cases of the height being smaller than the width, that the weights of the spatial related blocks located on a left side of the current block are smaller than the weights of the spatial related blocks on an upper side of the current block is determined. That is, the weight of the A1 block is smaller than the weight of the B1 block is determined. For example, the weight of the A1 block is 0.4, and the weight of the B1 block is 0.6, which is not specifically limited herein.

Figure 7:
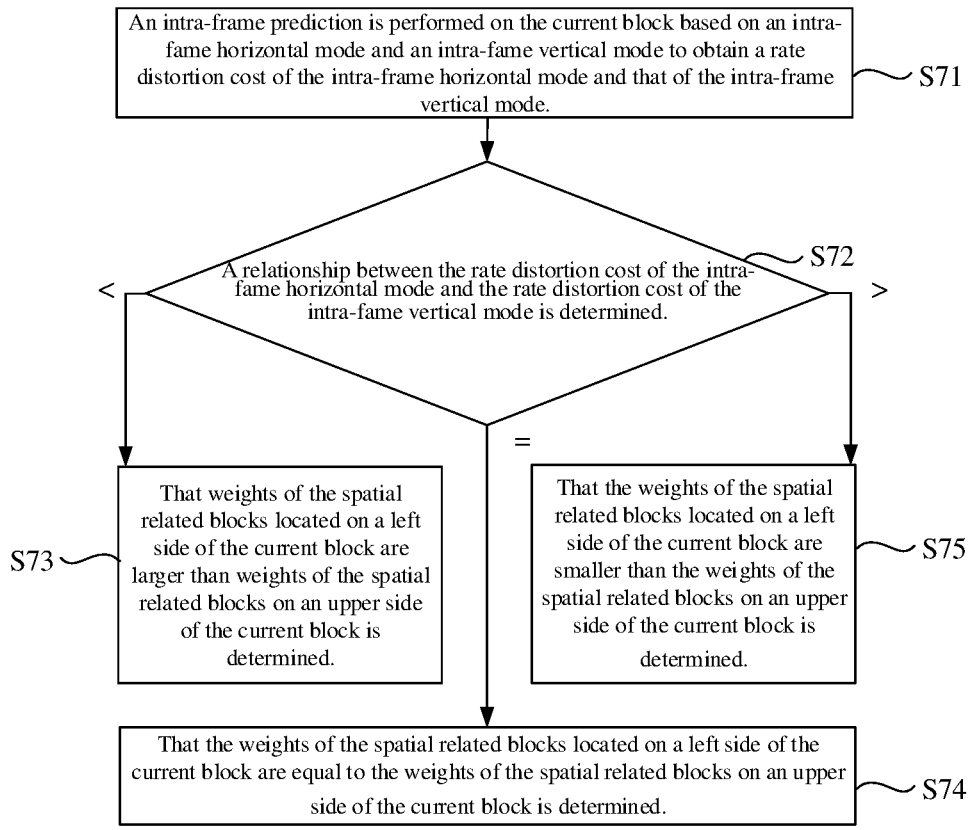
FIG. 7 is a schematic flowchart of block S12 in FIG. 1 according to another embodiment of the present disclosure.

Alternatively, in cases of determining the weights of at least part of the related motion vectors based on content characteristics of the current block, the weights of the spatial motion vectors may be determined based on the content characteristics of the current block, as shown in FIG. 7. FIG. 7 is a schematic flowchart of block S12 in FIG. 1 according to another embodiment of the present disclosure. Followed operations as illustrated in blocks shown in FIG. 7 may be included.

At block S71: An intra-frame prediction is performed on the current block based on an intra-fame horizontal mode and an intra-fame vertical mode to obtain a rate distortion cost of the intra-frame horizontal mode and that of the intra-frame vertical mode.

Specific technical details about the rate distortion cost of the intra-frame horizontal mode and that of the intra-frame vertical mode are of the prior art. Therefore, details will not be described again herein.

Further referring to FIG. 3, FIG. 3 is a schematic view of a position relationship between a current block and an adjacent block in a method for acquiring motion vectors according to an embodiment of the present disclosure. The size of the current block is a*b. Blocks at seven positions: A0, A1, A2, B0, B1, B2, and B3 are selected as adjacent blocks of the current block. In cases of only the blocks at A1, A2, B1 and B2 having been encoded, and A1 and B1 being inter-frame blocks, A2 and B2 being intra-frame copy blocks, in response to the current block being an inter-frame block, A1 and B1 are selected as the spatial related blocks of the current block; in response to the current block being an intra-frame copy block, A2 and B2 are selected as the spatial related blocks of the current block, which is not specifically limited herein.

At block S72: A relationship between the rate distortion cost of the intra-fame horizontal mode and the rate distortion cost of the intra-fame vertical mode is determined. In cases of the rate distortion cost of the intra-fame horizontal mode being smaller than the rate distortion cost of the intra-fame vertical mode, block S73 is performed. In cases of the rate distortion cost of the intra-fame horizontal mode being equal to the rate distortion cost of the intra-fame vertical mode, block S74 is performed. In cases of the rate distortion cost of the intra-fame horizontal mode being larger than the rate distortion cost of the intra-fame vertical mode, block S75 is performed.

A selection of A1 and B1 as the spatial related blocks of the current block is taken as an example. In cases of the rate distortion cost of the intra-fame horizontal mode being smaller than the rate distortion cost of the intra-fame vertical mode, block S73 is performed. In cases of the rate distortion cost of the intra-fame horizontal mode being equal to the rate distortion cost of the intra-fame vertical mode, block S74 is performed. In cases of the rate distortion cost of the intra-fame horizontal mode being larger than the rate distortion cost of the intra-fame vertical mode, block S75 is performed.

At block S73: That weights of the spatial related blocks located on a left side of the current block are larger than weights of the spatial related blocks on an upper side of the current block is determined.

In cases of the rate distortion cost of the intra-fame horizontal mode being smaller than the rate distortion cost of the intra-fame vertical mode, that the weights of the spatial related blocks located on a left side of the current block are larger than the weights of the spatial related blocks on an upper side of the current block is determined. That is, the weight of the A1 block is larger than the weight of the B1 block is determined. For example, the weight of the A1 block is 0.6, and the weight of the B1 block is 0.4, which is not specifically limited herein.

At block S74: That the weights of the spatial related blocks located on a left side of the current block are equal to the weights of the spatial related blocks on an upper side of the current block is determined.

In cases of the rate distortion cost of the intra-fame horizontal mode being equal to the rate distortion cost of the intra-fame vertical mode, that the weights of the spatial related blocks located on a left side of the current block are equal to the weights of the spatial related blocks on an upper side of the current block is determined. That is, the weight of the A1 block is equal to the weight of the B1 block is determined. For example, the weight of the A1 block is 0.5, and the weight of the B1 block is 0.5, which is not specifically limited herein.

At block S75: That the weights of the spatial related blocks located on a left side of the current block are smaller than the weights of the spatial related blocks on an upper side of the current block is determined.

In cases of the rate distortion cost of the intra-fame horizontal mode being larger than the rate distortion cost of the intra-fame vertical mode, that the weights of the spatial related blocks located on a left side of the current block are smaller than the weights of the spatial related blocks on an upper side of the current block is determined. That is, the weight of the A1 block is smaller than the weight of the B1 block is determined. For example, the weight of the A1 block is 0.4, and the weight of the B1 block is 0.6, which is not specifically limited herein.

In addition, the weights of spatial related blocks may also be determined based on an angle between a texture direction of the current block and a horizontal direction, and an angle between the texture direction of the current block and a vertical direction. For example, in response to the angle between a texture direction of the current block and the horizontal direction being smaller than the angle between the texture direction of the current block and the vertical direction, that the weights of the spatial related blocks located on a left side of the current block are larger than the weights of the spatial related blocks on an upper side of the current block is determined. In response to the angle between a texture direction of the current block and the horizontal direction being equal to the angle between the texture direction of the current block and the vertical direction, that the weights of the spatial related blocks located on a left side of the current block are equal to the weights of the spatial related blocks on an upper side of the current block is determined. In response to the angle between a texture direction of the current block and the horizontal direction being larger than the angle between the texture direction of the current block and the vertical direction, that the weights of the spatial related blocks located on a left side of the current block are smaller than the weights of the spatial related blocks on an upper side of the current block is determined.

Figure 8:
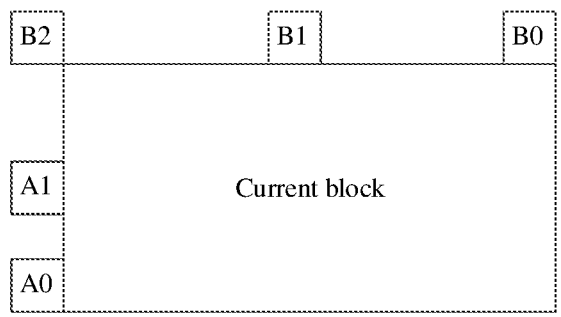
FIG. 8 is a schematic view of a position relationship between a current block and an adjacent block in a method for acquiring motion vectors according to another embodiment of the present disclosure.

Alternatively, in cases of determining the weights of at least part of the related motion vectors based on a position of the spatial related block relative to the current block, the weights of the spatial motion vectors may be determined based on the position of the spatial related block relative to the current block, as shown in FIG. 8. FIG. 8 is a schematic view of a position relationship between a current block and an adjacent block in a method for acquiring motion vectors according to another embodiment of the present disclosure. In the embodiments, the weights of the spatial related blocks and a distance of the spatial related block relative to the current block are negatively correlated. As shown in FIG. 8, the size of the current block is 32×16. Blocks at five positions: A0, A1, B0, B1, and B2 are selected as adjacent blocks of the current block. A1 and B1 are blocks at midpoints of the edges of the two, correspondingly. In response to the blocks at the five positions being inter-frame blocks with motion vectors, and the current block being also an inter-frame block, then motion vectors of the five position blocks A0, A1, B0, B1, and B2 are finally selected as spatial related blocks of the current block. Since the weights of the spatial related blocks and the distance of the spatial related block relative to the current block are negatively correlated, the weights of the five spatial related blocks A0, A1, B0, B1, and B2 may be determined to be 0.1, 0.2, 0.2, 0.3, 0.2, respectively. In cases of the positional relationship between the spatial related blocks and the current block being other positional relationships, the same can be deduced by analogy, and the embodiments will not be exemplified one by one here.

In some embodiments, in cases of a spatial motion vector $MV_i$ being obtained through the operations in the above embodiments, where i is a natural number in a range of [1, N], and a weight $a_i$ of the spatial motion vector $MV_i$ being determined, a weighted motion vector of the current block may be obtained according to the following formula.

$$MV_S = \frac{\sum_{i=1}^{N} MV_i \times a_i}{\sum_{i=1}^{N} a_i}$$

In other embodiments, in cases of a spatial motion vector $MV_i$ being obtained through the operations in the above embodiments, where i is a natural number in a range of [1, N], and a weight $a_i$ of the spatial motion vector $MV_i$ being determined, a weighted motion vector of the current block may also be obtained according to the following formula.

$$MV_s = \sum_{i=1}^{N} MV_i \times a_i$$

where $\sum_{i=1}^{N} a_i = 1$

In addition, while calculating the weighted motion vector of the current block, it is also necessary to determine a reference frame and a reference frame list of the current block. Specifically, a reference frame of the spatial related block with the largest weight may be configured as the reference frame of the current block. A reference frame list of the spatial related block with the largest weight may be configured as the reference frame list of the current block.

Figure 9:
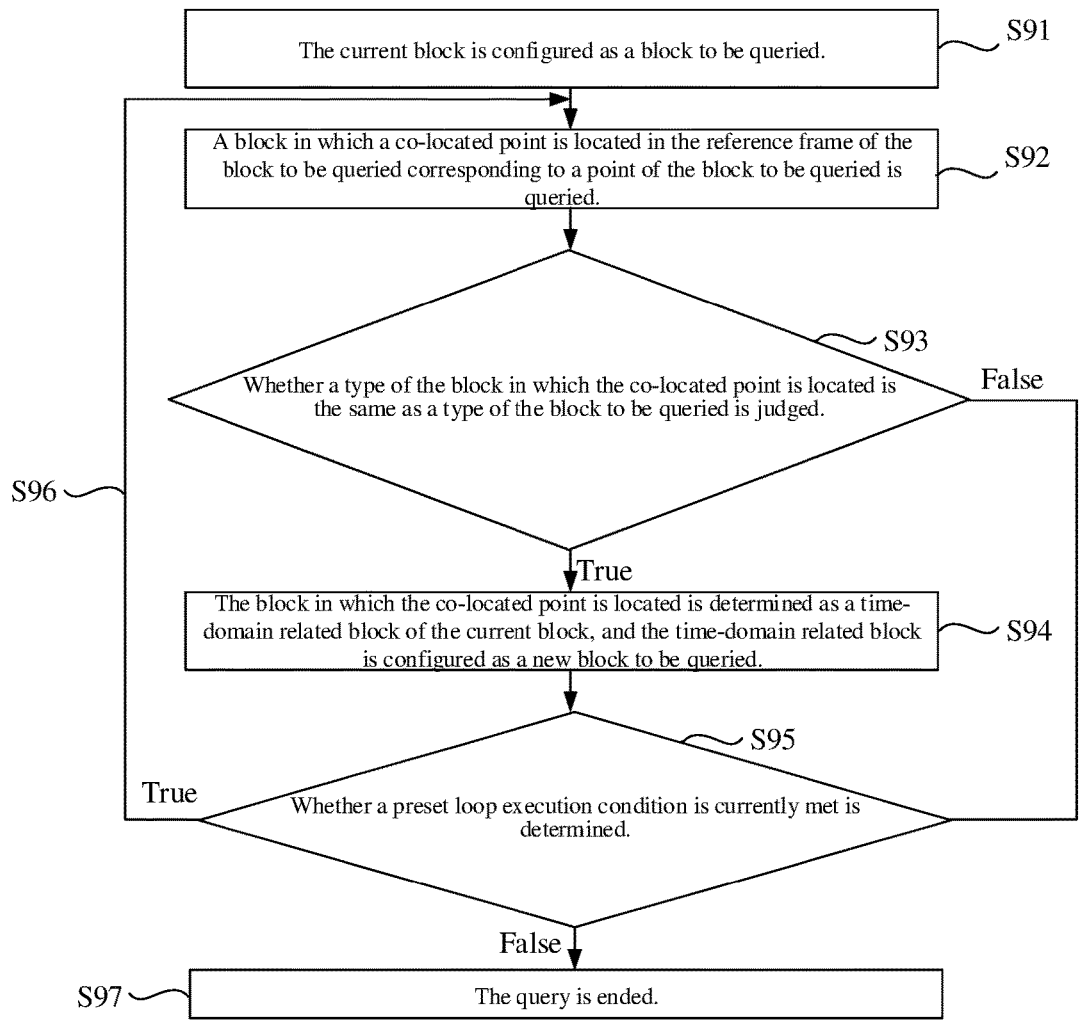
FIG. 9 is a schematic flowchart of block S11 in FIG. 1 according to an embodiment of the present disclosure.

In other embodiments, in cases of the related motion vectors including temporal motion vectors, referring to FIG. 9. FIG. 9 is a schematic flowchart of block S11 in FIG. 1 according to an embodiment of the present disclosure. Followed operations as illustrated in blocks shown in FIG. 9 may be included.

At block S91: The current block is configured as a block to be queried.

Figure 10:
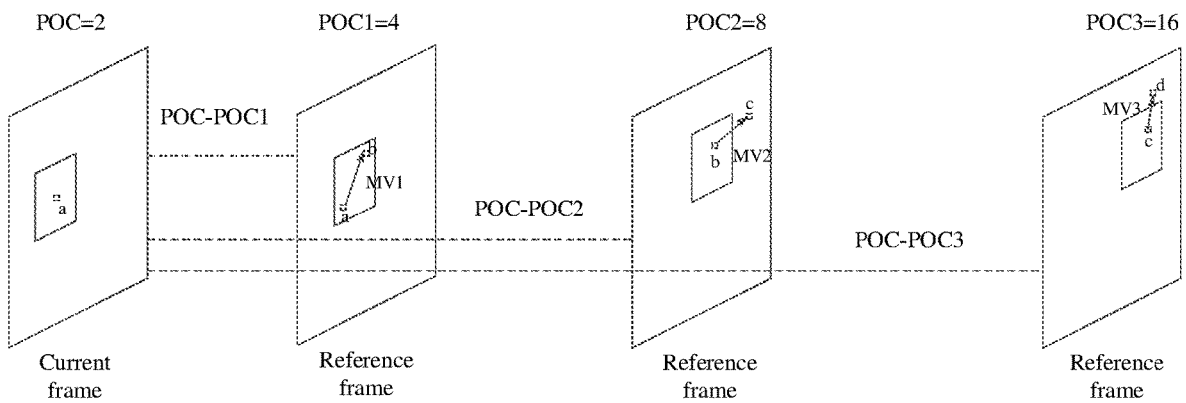
FIG. 10 is a scaled schematic view of temporal motion vectors in a method for acquiring motion vectors according to another embodiment of the present disclosure.

Referring to FIG. 10, FIG. 10 is a scaled schematic view of temporal motion vectors in a method for acquiring motion vectors according to another embodiment of the present disclosure. The current frame in which the current block is located is POC=2, the current block is 16×16, and the reference frame POC list of the current frame is {0, 4, 8, 16}. It is assumed that a reference relationship between the frames is: the current frame refers to a frame with POC of 4, the frame with POC of 4 refers to a frame with POC of 8, the frame with POC of 8 refers to a frame with POC of 16, the frame with POC of 16 refers to a frame with POC of 0, and the frame with POC of 0 is an I frame. Here POC represents picture order count.

In the embodiments, in an initial state, the current block is configured as the block to be queried.

At block S92: A block in which a co-located point is located in the reference frame of the block to be queried corresponding to a point of the block to be queried is queried.

Specifically, A block in which a co-located point is located in the reference frame of the block to be queried corresponding to a point of the block to be queried may be determined. In response to a type of the block in which the co-located point is located being the same as a type of the block to be queried, an offset co-located point is queried. The offset co-located point is a point corresponding to the co-located point after offsetting with an inter-frame motion vector. The offset co-located point is determined as the corresponding co-located point in the reference frame of the block to be queried.

Referring to FIG. 10, the block to be queried in the initial state (that is, the current block) is selected. A center point a of the block to be queried is selected as a co-located point for starting. A frame with POC of 4 is configured as the reference frame. Whether a type of a block in which the center point a is located in the frame with POC of 4 is the same as a type of the block to be queried is queried. In response to the two types being the same, an offset co-located point is queried. The offset co-located point is a point corresponding to the co-located point after offsetting with an inter-frame motion vector MV1. The offset co-located point is determined as the corresponding co-located point in the reference frame of the block to be queried.

At block S93: Whether a type of the block in which the co-located point is located is the same as a type of the block to be queried is judged. In response to the two types being the same, block S94 is performed, otherwise block S97 is performed.

Referring to FIG. 10, in response to the type of the block in which the center point a is located in the frame with POC of 4 being determined to be the same as the type of the block to be queried, the block is configured as a temporal related block of the current block and the temporal related block is configured as a new block to be queried. In response to the type of the block in which the center point a is located in the frame with POC of 4 being determined to be different from the type of the block to be queried, the query is directly ended.

At block S94: The block in which the co-located point is located is determined as a temporal related block of the current block, and the temporal related block is configured as a new block to be queried.

Further referring to FIG. 10, since the type of the block in which the center point a is located in the frame with POC of 4 is determined to be the same as the type of the block to be queried, the block is determined as a temporal related block of the current block, and the temporal related block is configured as a new block to be queried.

At block S95: Whether a preset loop execution condition is currently met is determined. In response to the preset loop execution condition being met, block S96 is performed, otherwise block S97 is performed.

In the embodiments, the preset loop execution condition may be that a number of temporal related blocks reaches a preset amount, or the type of the block in which the co-located point is located is different from the type of the block to be queried.

At block S96: block S92 and subsequent operations are performed again.

Since the preset loop execution condition is met, block S92 and subsequent operations are performed again. Referring to FIG. 10, point a is offset to point b with MV1, point b is offset to point c with MV2. In response to the block in which point c is located in a reference frame with POC of 16 being the same as the type of the block to be queried, point c is continued to offset to point d with MV3. The reference frame with POC of 16 is an I frame with POC of 0. In response to the block in which point d is located in a reference frame with POC of 0 being different from the type of the block to be queried, the query is ended. The temporal motion vectors queried include MV1, MV2, and MV3.

At block S97: The query is ended.

In the embodiments, the related motion vectors are temporal motion vectors. Accordingly, in cases of determining the weights of at least part of the related motion vectors, a weight of each temporal related block may be determined according to a distance between the current block and each temporal related block. The weight of each temporal related block is negatively correlated to the distance between the current block and each temporal related block. Referring to FIG. 10, in cases of a ratio of distances between the current frame and each reference frame from near to far being 1:3:7, the weight relationship between MV1, MV2, and MV3 may be configured according to the ratio of distances as b1=7/11, b2=3/11, b3=1/11.

In some embodiments, in cases of the temporal motion vector MVi being obtained through the operations in the above embodiments, where i is a natural number in a range of [1, N], and a weight $b_i$ of the temporal motion vector $MV_i$ being determined, a weighted motion vector of the current block may also be obtained according to the following formula.

$$MV_t = \frac{\sum_{i=1}^{N} MV_i \times b_i}{\sum_{i=1}^{N} b_i}$$

In other embodiments, in cases of a temporal motion vector $MV_i$ being obtained through the operations in the above embodiments, where i is a natural number in a range of [1, N], and a weight $b_i$ of the temporal motion vector $MV_i$ being determined, a weighted motion vector of the current block may also be obtained according to the following formula.

$$Mt_s = \sum_{i=1}^{N} MV_i \times b_i$$

where $\sum_{i=1}^{N} b_i = 1$

In addition, while calculating the weighted motion vector of the current block, it is also necessary to determine a reference frame and a reference frame list of the current block. Specifically, a reference frame of the temporal related block with the largest weight may be configured as the reference frame of the current block. A reference frame list of the temporal related block with the largest weight may be configured as the reference frame list of the current block.

Figure 11:
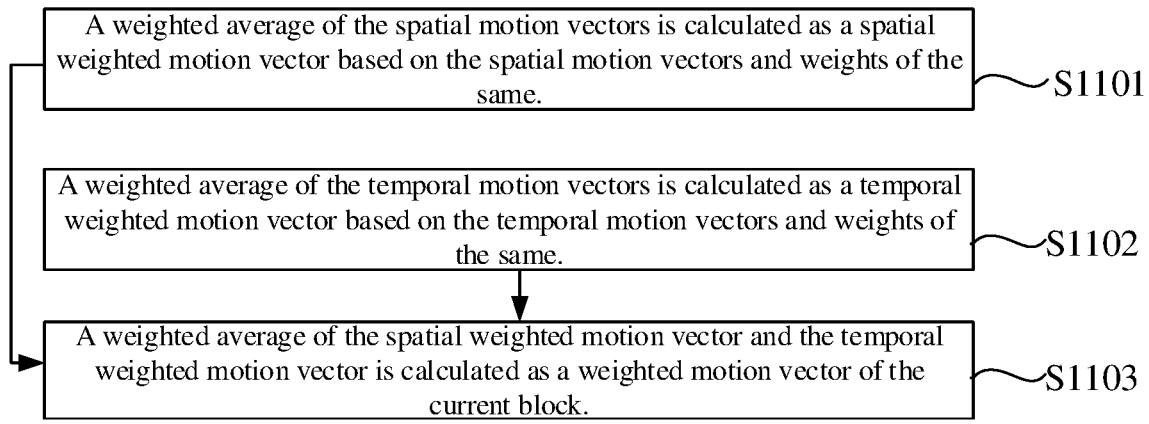
FIG. 11 is a schematic flowchart of block S13 in FIG. 1 according to an embodiment of the present disclosure.

In other embodiments, in cases of the related motion vectors including the temporal motion vectors and the spatial motion vectors, referring to FIG. 11. FIG. 11 is a schematic flowchart of block S13 in FIG. 1 according to an embodiment of the present disclosure. Followed operations as illustrated in blocks shown in FIG. 11 may be included.

At block S1101: A weighted average of the spatial motion vectors is calculated as a spatial weighted motion vector based on the spatial motion vectors and weights of the same.

In cases of the related motion vectors including the spatial motion vectors, reference may be made to the operations in the foregoing embodiments to determine the weights corresponding to the spatial motion vectors, which is not described herein.

In the embodiments, the spatial weighted motion vector MVs is determined based on the spatial motion vectors and weights of the same.

At block S1102: A weighted average of the temporal motion vectors is calculated as a temporal weighted motion vector based on the temporal motion vectors and weights of the same.

In cases of the related motion vectors including the temporal motion vectors, reference may be made to the operations in the foregoing embodiments to determine the weights corresponding to the temporal motion vectors, which is not described herein.

In the embodiments, the temporal weighted motion vector MVt is determined based on the temporal motion vectors and weights of the same.

The above blocks S1101 and S1102 may be performed in sequence. For example, block S1101 is performed first, then block S1102 is performed. Or, block S1102 is performed first, and then block S1101 is performed. In addition, the above blocks S1101 and S1102 may also be performed at the same time, which is not specifically limited herein.

At block S1103: A weighted average of the spatial weighted motion vector and the temporal weighted motion vector is calculated as a weighted motion vector of the current block.

In some embodiments, a weight $\alpha$ of MVs may be determined, and a weight $\beta$ corresponding to MVt may be determined. In cases of a sum of $\alpha$ and $\beta$ being 1, a weighted motion vector of the current block may be described as: MVst=$\alpha$*MVs+$\beta$*MVt. In cases of the sum of $\alpha$ and $\beta$ being larger than 1, the weighted motion vector MVst of the current block may be described as: MVst=($\alpha$*MVs+$\beta$*MVt)/($\alpha$+$\beta$).

In addition, while calculating the weighted motion vector of the current block, it is also necessary to determine a reference frame and a reference frame list of the current block. Specifically, reference may be made to determining the reference frame and the reference frame list of the current block in the embodiments of the related motion vectors including the spatial motion vectors. Reference may be also made to determining the reference frame and the reference frame list of the current block in the embodiments of the related motion vectors including the temporal motion vectors, which is not repeated herein.

In the foregoing embodiments of the method for acquiring motion vectors, the related motion vector may include spatial motion vectors, the related motion vector may also include temporal motion vectors, and the related motion vector may also include spatial motion vectors and temporal motion vectors. The operations in any one of the above embodiments may be performed to obtain the motion vectors of the spatial related block of the current block, or the motion vectors of the temporal related block of the current block, or the motion vectors of the spatial related block and the temporal related block of the current block, which is not specifically limited herein.

In addition, in the operations in any of the embodiments of the method for acquiring motion vectors, based on the acquiring the motion vectors of the related block of the current block, prediction may be further performed based on the acquired related motion vectors to determine a final motion vector of the current block.

Figure 12:
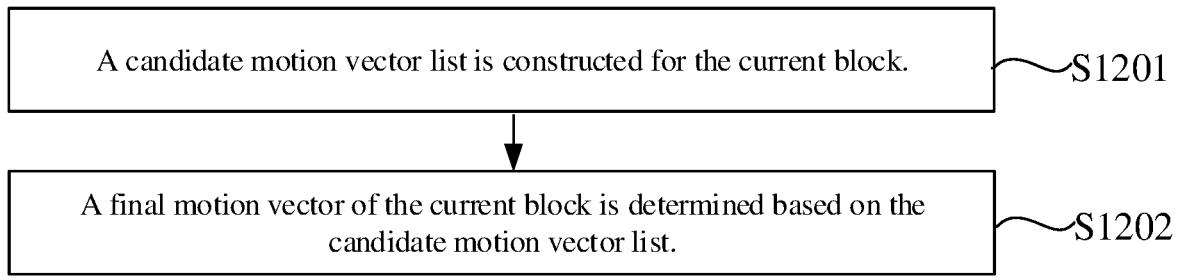
FIG. 12 is a schematic flowchart of a motion vector-based prediction method according to an embodiment of the present disclosure.

In some embodiments, referring to FIG. 12, FIG. 12 is a schematic flowchart of a motion vector-based prediction method according to an embodiment of the present disclosure. Followed operations as illustrated in blocks shown in FIG. 12 may be included.

At block S1201: A candidate motion vector list is constructed for the current block.

In the embodiments, the weighted motion vector of the current block may be obtained through the operations of any one of the foregoing embodiments of the method for acquiring motion vectors. The constructed candidate motion vector list includes the weighted motion vector, which is not repeated herein.

At block S1202: A final motion vector of the current block is determined based on the candidate motion vector list.

In some embodiments, the motion vectors in the candidate motion vector list may be separately motion compensated, and then a low-complexity sum of absolute transformed difference (SATD, that is, an absolute sum of coefficients after Hardman transform of residuals) is configured to obtain a rate distortion cost Rdcost of different motion vectors. Based on the obtained rate distortion cost Rdcost, a plurality of motion vectors with a low rate distortion cost are determined from the candidate motion vector list. Finally, sum of squared error (SSE) with a higher complexity is configured to calculate the rate distortion cost of the above-mentioned plurality of motion vectors. A motion vector with the lowest rate distortion cost is selected as the final motion vector of the current block. The selected final motion vector may be a weighted motion vector or other motion vectors in the candidate list, which is not specifically limited herein.

In other embodiments, a motion search may be performed with the motion vectors in the candidate motion vector list as starting points, respectively based on several motion search directions and several motion search amplitudes. In this way, motion vector offsets of the motion vectors under different motion combinations are obtained. The motion vector and a motion vector offset of the motion vector are added to obtain a corresponding search motion vector. A motion vector of which a rate distortion cost meets a preset cost condition is selected as the final motion vector of the current block. The calculation method of the rate distortion cost may be referring to the calculation methods in the foregoing embodiments, which is not repeated herein. In addition, the final motion vector of the current block may also be determined in other ways, which will not be exemplified one by one herein.

The motion vector-based prediction method in the embodiments may be applied to the inter-frame prediction mode, such as: the conventional Merge mode, the conventional AMVP mode. The motion vector-based prediction method in the embodiments may be also applied to the intra-frame block copy mode, such as the Merge_IBC mode, the AMVP_IBC Mode, which is not limited herein. Therefore, the method for acquiring motion vectors in the embodiments can be applied to all existing modes of motion vector prediction, having a good compatibility.

In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

Figure 13:
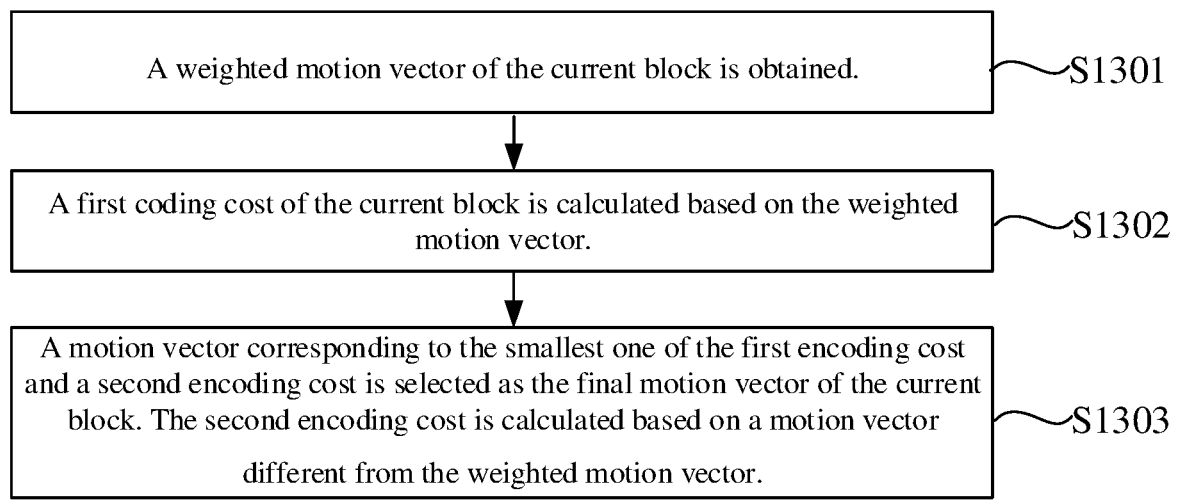
FIG. 13 is a schematic flowchart of a motion vector-based prediction method according to another embodiment of the present disclosure.

In other embodiments, referring to FIG. 13, FIG. 13 is a schematic flowchart of a motion vector-based prediction method according to another embodiment of the present disclosure. Followed operations as illustrated in blocks shown in FIG. 13 may be included.

At block S1301: A weighted motion vector of the current block is obtained.

In the embodiments, the weighted motion vector of the current block may be obtained through the operations of any one of the foregoing method embodiments of the method for acquiring motion vectors, which is not repeated herein.

At block S1302: A first coding cost of the current block is calculated based on the weighted motion vector.

The first coding cost may be the rate distortion cost of the weighted motion vector. In some embodiments, the rate distortion cost may be calculated by referring to the operations in the foregoing embodiments of the motion vector-based prediction method, which is not repeated herein.

At block S1303: A motion vector corresponding to the smallest one of the first encoding cost and a second encoding cost is selected as the final motion vector of the current block. The second encoding cost is calculated based on a motion vector different from the weighted motion vector.

The second encoding cost may be obtained by calculating a motion vector different from the weighted motion vector. The specific calculation method may refer to the operations in the foregoing embodiments of the motion vector-based prediction method, which is not repeated herein.

A motion vector corresponding to the smallest one of the first encoding cost and the second encoding cost is selected as the final motion vector of the current block.

The motion vector-based prediction method in the embodiments may be applied to the inter-frame prediction mode, such as: the conventional Merge mode, the conventional AMVP mode. The motion vector-based prediction method in the embodiments may be also applied to the intra-frame block copy mode, such as the Merge_IBC mode, the AMVP_IBC Mode, which is not limited herein. Therefore, the method for acquiring motion vectors in the embodiments can be applied to all existing modes of motion vector prediction, having a good compatibility.

In the above embodiments, the obtained weighted motion vector may be embedded in the existing the inter-frame prediction mode, or the intra-frame block copy mode with motion vectors different from the weighted motion vector. Or, different from the existing inter-frame mode in which motion vectors different from the weighted motion vector are embedded, the obtained weighted motion vector may also be added to a new inter-frame mode juxtaposed with the conventional Merge mode and conventional AMVP mode. Or, different from the existing intra-frame block copy mode in which motion vectors different from the weighted motion vector are embedded, the obtained weighted motion vector may also be added to a new intra-frame block copy mode juxtaposed with Merge_IBC and AMVP_IBC, which is not specifically limited herein.

In addition, in some embodiments, in cases of the final motion vector being configured to encode and obtain a code stream of the current block, and the final motion vector being the weighted motion vector, the code stream of the current block includes a first syntax element. The first syntax element is configured to indicate that the final motion vector is a weighted motion vector. For example, in cases of the obtained final motion vector being embedded in an inter-frame mode such as conventional Merge, conventional AMVP, or an intra-frame block copy prediction mode such as Merge_IBC, AMVP_IBC, the final motion vector may be represented by an index syntax element. Or, in cases of the obtained final motion vector being added as a new prediction mode to an intra-frame block copy prediction mode such as Merge_IBC, AMVP_IBC, the final motion vector may be expressed by a syntax element DMV_IBC_flag. Or, in cases of the obtained final motion vector being added as a new prediction mode to an inter-frame prediction mode such as conventional Merge, conventional AMVP, the final motion vector may be expressed by a syntax element DMV_INTER_flag.

In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

Figure 14:
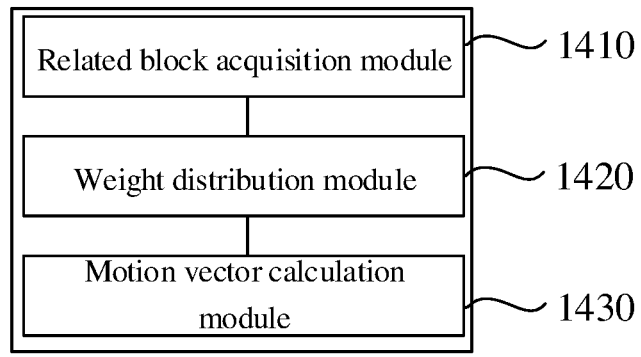
FIG. 14 is a schematic view of a device for acquiring motion vectors according to an embodiment of the present disclosure.

Referring to FIG. 14, FIG. 14 is a schematic view of a device 1400 for acquiring motion vectors according to an embodiment of the present disclosure. The device 1400 may include a related block acquisition module 1410, a weight distribution module 1420, and a motion vector calculation module 1430. The related block acquisition module 1410 is configured to acquire a plurality of related motion vectors of the current block. The related motion vectors are motion vectors of the related block of the current block. A prediction mode of the related block is the same as a current prediction mode of the current block. Encoding has been completed. The weight distribution module 1420 is configured to determine the weights of at least part of the related motion vectors. The motion vector calculation module 1430 is configured to calculate the weighted motion vector of the current block based on at least part of the related motion vectors and the weights of the same.

The device 1400 in the embodiments may be applied to the inter-frame prediction mode, such as: the conventional Merge mode, the conventional AMVP mode. The device 1400 in the embodiments may be also applied to the intra-frame block copy mode, such as the Merge_IBC mode, the AMVP_IBC Mode, which is not limited herein. Therefore, the device 1400 in the embodiments can be applied to all existing modes of motion vector prediction, having a good compatibility.

In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

In some embodiments, the related motion vectors include spatial motion vectors and/or temporal motion vectors. The spatial motion vectors are motion vectors of the spatial related block. The spatial related block belongs to the current frame and is located on an encoded side of the current block. The temporal motion vectors are motion vectors of the temporal related block. The temporal related block does not belong to the current frame.

In some embodiments, the related motion vectors include spatial motion vectors. The weight distribution module 1420 is configured to determine the weights of at least part of the related motion vectors based on at least one of a size of the current block, content characteristics of the current block, and a position of the spatial related block relative to the current block.

In some embodiments, the weight distribution module 1420 includes a first weight distribution sub-module for determining that weights of the spatial related blocks located on a left side of the current block are larger than weights of the spatial related blocks on an upper side of the current block, in cases of the height of the current block being larger than the width. The first weight distribution sub-module is also configured to determine that the weights of the spatial related blocks located on a left side of the current block are equal to the weights of the spatial related blocks on an upper side of the current block, in cases of the height being equal to the width. The first weight distribution sub-module is also configured to determine that the weights of the spatial related blocks located on a left side of the current block are smaller than the weights of the spatial related blocks on an upper side of the current block, in cases of the height being smaller than the width.

In some embodiments, the weight distribution module 1420 includes a second weight distribution sub-module for determining that the weights of the spatial related blocks located on a left side of the current block are larger than the weights of the spatial related blocks on an upper side of the current block, in cases of the rate distortion cost of the intra-fame horizontal mode being smaller than the rate distortion cost of the intra-fame vertical mode. The second weight distribution sub-module is also configured to determine that the weights of the spatial related blocks located on a left side of the current block are equal to the weights of the spatial related blocks on an upper side of the current block, in cases of the rate distortion cost of the intra-fame horizontal mode being equal to the rate distortion cost of the intra-fame vertical mode. The second weight distribution sub-module is also configured to determine that the weights of the spatial related blocks located on a left side of the current block are smaller than the weights of the spatial related blocks on an upper side of the current block, in cases of the rate distortion cost of the intra-fame horizontal mode being larger than the rate distortion cost of the intra-fame vertical mode.

In some embodiments, the weights of the spatial related blocks and a distance of the spatial related block relative to the current block are negatively correlated.

In some embodiments, the related motion vectors include temporal motion vectors. The related block acquisition module 1410 includes a determination unit for configuring the current block as a block to be queried. The related block acquisition module 1410 further includes a query unit for querying a block in which a co-located point is located in the reference frame of the block to be queried corresponding to a point of the block to be queried. The related block acquisition module 1410 further includes a judging unit for judging whether a type of the block in which the co-located point is located is the same as a type of the block to be queried. In response to the two types being the same, the block in which the co-located point is located is determined as a temporal related block of the current block, and the temporal related block is configured as a new block to be queried. The related block acquisition module 1410 further includes a repeating execution unit for repeatedly executing the querying a block in which a co-located point is located in the reference frame of the block to be queried corresponding to a point of the block to be queried, and subsequent operations, until a number of temporal related blocks reaches a preset amount, or the type of the block in which the co-located point is located is different from the type of the block to be queried.

In some embodiments, the query unit is specifically configured to determine a block in which a co-located point is located in the reference frame of the block to be queried corresponding to a point of the block to be queried. The query unit is further configured to query an offset co-located point and determine the offset co-located point as the corresponding co-located point in the reference frame of the block to be queried, in response to a type of the block in which the co-located point is located being the same as a type of the block to be queried. The offset co-located point is a point corresponding to the co-located point after offsetting with an inter-frame block motion vector.

In some embodiments, the related motion vectors include temporal motion vectors. The weight distribution module 1420 is also configured to determine the weights of the temporal related motion vectors based on distances of each temporal related block relative to the current block. The weight of each temporal related block and the distance of each temporal related block relative to the current block are negatively correlated.

In some embodiments, the related motion vectors include spatial motion vectors and temporal motion vectors. The weight distribution module 1420 is further specifically configured to calculate a weighted average of the temporal motion vectors as a temporal weighted motion vector based on the temporal motion vectors and weights of the same. The distribution module 1420 is further configured to calculate a weighted average of the spatial motion vectors as a spatial weighted motion vector based on the spatial motion vectors and weights of the same. The distribution module 1420 is further configured to calculate a weighted average of the spatial weighted motion vector and the temporal weighted motion vector as a weighted motion vector of the current block.

Figure 15:
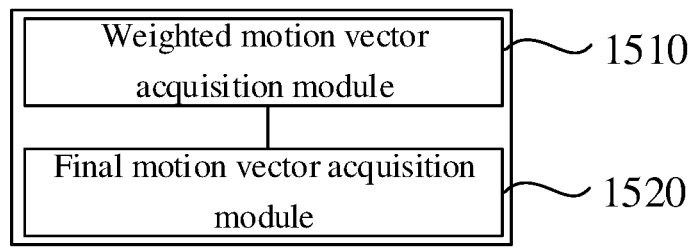
FIG. 15 is a schematic view of a motion vector-based prediction device according to a first embodiment of the present disclosure.

Referring to FIG. 15, FIG. 15 is a schematic view of a motion vector-based prediction device 1500 according to a first embodiment of the present disclosure. In the embodiments, the motion vector-based prediction device 1500 includes a weighted motion vector acquisition module 1510 and a final motion vector acquisition module 1520. The weighted motion vector acquisition module 1510 is configured to construct a candidate motion vector list for the current block. The candidate motion vector list includes the weighted motion vector obtained by the operations in any one of the foregoing embodiments of the method for acquiring motion vectors. The final motion vector acquisition module 1520 is configured to determine a final motion vector of the current block based on the candidate motion vector list.

The motion vector-based prediction device 1500 in the embodiments may be applied to the inter-frame prediction mode, such as: the conventional Merge mode, the conventional AMVP mode. The motion vector-based prediction method in the embodiments may be also applied to the intra-frame block copy mode, such as the Merge_IBC mode, the AMVP_IBC Mode, which is not limited herein. Therefore, the motion vector-based prediction device 1500 in the embodiments can be applied to all existing modes of motion vector prediction, having a good compatibility.

In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

Figure 16:
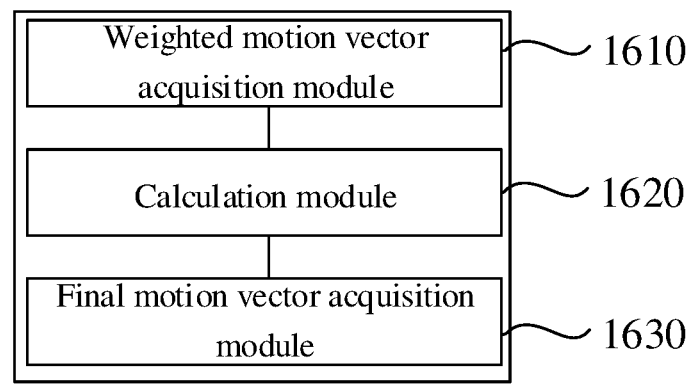
FIG. 16 is a schematic view of a motion vector-based prediction device according to a second embodiment of the present disclosure.

Referring to FIG. 16, FIG. 16 is a schematic view of a motion vector-based prediction device 1600 according to a second embodiment of the present disclosure. In the embodiments, the motion vector-based prediction device 1600 includes a weighted motion vector acquisition module 1610, a calculation module 1620, and a final motion vector acquisition module 1630. The weighted motion vector acquisition module 1610 is configured to obtain the weighted motion vector of the current block through the operations in any one of the foregoing embodiments of the method for acquiring motion vectors. The calculation module 1620 is configured to calculate a first coding cost of the current block based on the weighted motion vector. The final motion vector acquisition module 1630 is configured to select a motion vector corresponding to the smallest one of the first encoding cost and a second encoding cost as the final motion vector of the current block. The second encoding cost is calculated based on a motion vector different from the weighted motion vector.

The motion vector-based prediction device 1600 in the embodiments may be applied to the inter-frame prediction mode, such as: the conventional Merge mode, the conventional AMVP mode. The motion vector-based prediction device 1600 in the embodiments may be also applied to the intra-frame block copy mode, such as the Merge_IBC mode, the AMVP_IBC Mode, which is not limited herein. Therefore, the motion vector-based prediction device 1600 in the embodiments can be applied to all existing modes of motion vector prediction, having a good compatibility. In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

In some embodiments, the motion vector-based prediction device 1600 further includes an encoding module configured to encode and obtain a code stream of the current block. In case of the final motion vector being the weighted motion vector, the code stream of the current block includes a first syntax element. The first syntax element is configured to indicate that the final motion vector is a weighted motion vector.

Figure 17:
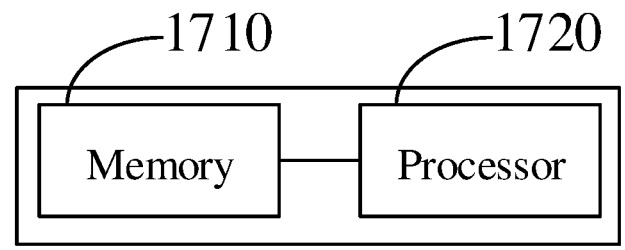
FIG. 17 is a schematic view of a device for acquiring motion vectors according to another embodiment of the present disclosure.

Referring to FIG. 17, FIG. 17 is a schematic view of a device 1700 for acquiring motion vectors according to another embodiment of the present disclosure. In the embodiments, the device 1700 includes a memory 1710 and a processor 1720 coupled to each other. The processor 1720 is configured to execute program instructions stored in the memory 1710 to implement operations in any one of the foregoing methods for acquiring motion vectors.

The device 1700 in the embodiments may be applied to the inter-frame prediction mode, such as: the conventional Merge mode, the conventional AMVP mode. The device 1700 in the embodiments may be also applied to the intra-frame block copy mode, such as the Merge_IBC mode, the AMVP_IBC Mode, which is not limited herein. Therefore, the device 1700 in the embodiments can be applied to all existing modes of motion vector prediction, having a good compatibility.

Specifically, the processor 1720 is configured to control itself and the memory 1710 to implement operations in any one of the foregoing method embodiments for acquiring motion vectors. The processor 1720 may also be referred to as a central processing unit (CPU). The processor 1720 may be an integrated circuit chip with signal processing capabilities. The processor 1720 may also be a general-purpose processor, a digital signal processor (DSP), an application specific integrated circuit (ASIC), a field-programmable gate array (FPGA), or other programmable logic devices, discrete gate or transistor logic devices, discrete hardware components. The general-purpose processor may be a microprocessor or the processor may be any conventional processor or the like. In addition, the processor 1720 may be cooperatively implemented by a plurality of integrated circuit chips.

In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

Figure 18:
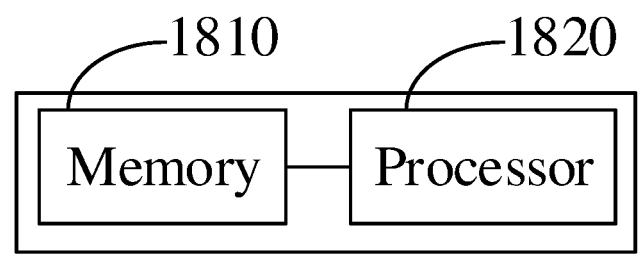
FIG. 18 is a schematic view of a motion vector-based prediction device according to a third embodiment of the present disclosure.

Referring to FIG. 18, FIG. 18 is a schematic view of a motion vector-based prediction device 1800 according to a third embodiment of the present disclosure. The motion vector-based prediction device 1800 includes a memory 1810 and a processor 1820 coupled to each other. The processor 1820 is configured to execute program instructions stored in the memory 1810 to implement operations in any one of the foregoing methods for acquiring motion vectors.

The motion vector-based prediction device 1800 in the embodiments may be applied to the inter-frame prediction mode, such as: the conventional Merge mode, the conventional AMVP mode. The motion vector-based prediction device 1800 in the embodiments may be also applied to the intra-frame block copy mode, such as the Merge_IBC mode, the AMVP_IBC Mode, which is not limited herein. Therefore, the motion vector-based prediction device 1800 in the embodiments can be applied to all existing modes of motion vector prediction, having a good compatibility.

Specifically, the processor 1820 is configured to control itself and the memory 1810 to implement operations in any one of the foregoing method embodiments for acquiring motion vectors. The processor 1820 may also be referred to as a central processing unit (CPU). The processor 1820 may be an integrated circuit chip with signal processing capabilities. The processor 1820 may also be a general-purpose processor, a digital signal processor (DSP), an application specific integrated circuit (ASIC), a field-programmable gate array (FPGA), or other programmable logic devices, discrete gate or transistor logic devices, discrete hardware components. The general-purpose processor may be a microprocessor or the processor may be any conventional processor or the like. In addition, the processor 1820 may be cooperatively implemented by a plurality of integrated circuit chips.

In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

Figure 19:
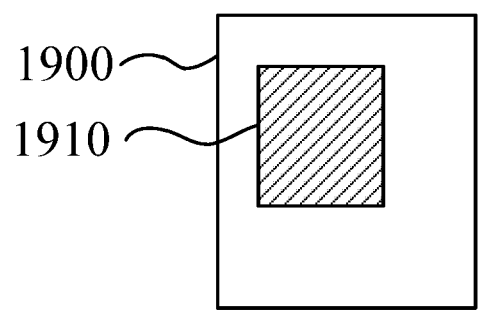
FIG. 19 is a schematic view of a storage device according to an embodiment of the present disclosure.

Referring to FIG. 19, FIG. 19 is a schematic view of a storage device 1900 according to an embodiment of the present disclosure. The storage device 1900 stores program instructions 1910 capable of implementing all the methods described above. The program instructions 1910 are executed to implement the operations in any one of the foregoing method embodiments for obtaining motion vectors, or implement the operations in any one of the foregoing motion vector-based methods. The program instruction 1910 may be stored in the above storage device in form of a software product, and includes several instructions for instructing a computer device (which may be a personal computer, a server, or a network device) or a processor to execute all or part of the operations of the methods described in the embodiments. The foregoing storage device includes: U disks, mobile hard disks, read-only memory (ROM), random access memory (RAM), magnetic disks or optical disks, and other media that can store program codes; or terminal devices such as computers, servers, mobile phones, and tablets.

In the above embodiments, a plurality of related motion vectors of the current block are obtained. The related motion vectors are motion vectors of the related block of the current block. A prediction mode of the related block is the same as a current prediction mode of the current block. Encoding has been completed. Weights of at least part of the related motion vectors are determined. A weighted motion vector of the current block is calculated based on at least part of the related motion vectors and the weights of the same. In this way, a correlation between the related block and the current block may be fully utilized, which can improve an accuracy of the prediction and a coding compression rate.

In the embodiments provided in the present disclosure, it should be understood that the disclosed systems, devices, and methods may be implemented in other ways. For example, the device embodiments described above are only schematic. For example, the division of units is only a logical function division. In actual implementation, there may be another division manner. For example, multiple units or components may be combined or integrated to another system, or some features can be ignored or not implemented. In addition, the illustrated or described mutual coupling or direct coupling or communication connection may be through some interfaces. The indirect coupling or communication connection of devices or units may be electrical, mechanical, or other forms.

In addition, each functional unit in the embodiments of the present disclosure may be integrated into one processing unit, or each of the units may exist separately physically, or two or more units may be integrated into one unit. The integrated unit may be implemented in form of hardware or software functional unit. The above embodiments are only implementations of the present disclosure, but not to limit the scope of the present disclosure. Any equivalent structure or equivalent process transformation based on the description and drawings of the present disclosure, or directly or indirectly used in other related technical fields, are within the scope of the present disclosure.

In addition, it should be understood that unless explicitly defined, "a" or "the" single element, such as "a motion vector" or "the motion vector" may refer to a class of the elements, a single element, or more than one elements. It shall be understandable for those of ordinary skills in the art, that a correct interpretation of the above expressions can be deduced under certain application scenarios.

What is claimed is:

1. A method for acquiring motion vectors, comprising:
obtaining a plurality of related motion vectors of a current block, wherein the plurality of related motion vectors are motion vectors of a related block of the current block, a prediction mode of the related block is the same as a current prediction mode of the current block, an encoding has been completed; wherein the plurality of related motion vectors comprise temporal motion vectors; the temporal motion vectors are motion vectors of a temporal related block; the temporal related block does not belong to the current frame; the obtaining the plurality of related motion vectors of the current block comprises:
configuring the current block as a block to be queried;
querying a block in which a co-located point is located in a reference frame of the block to be queried corresponding to a point of the block to be queried;
determining the block in which the co-located point is located as the temporal related block of the current block and configuring the temporal related block as a new block to be queried, in response to a type of the block in which the co-located point is located being the same as a type of the block to be queried; and
repeatedly performing the querying the block in which the co-located point is located in the reference frame of the block to be queried corresponding to the point of the block to be queried, and subsequent operations, until a number of temporal related blocks reaches a preset amount, or the type of the block in which the co-located point is located is different from the type of the block to be queried;
determining weights of at least part of the plurality of related motion vectors, comprising:
determining a weight of the temporal related block based on a distance of the temporal related block relative to the current block; wherein the weight of the temporal related block and the distance of the temporal related block relative to the current block are negatively correlated; and
calculating a weighted motion vector of the current block based on at least part of the plurality of related motion vectors and the weights of at least part of the plurality of related motion vectors, comprising:
in response to a sum of weights of the temporal motion vectors being equal to 1, the temporal motion vectors and the weights of the same are configured to perform a weighted sum operation to obtain a weighted motion vector of the current block; or,
in response to the sum of weights of the temporal motion vectors not being equal to 1, the temporal motion vectors and the weights of the same are configured to perform a weighted average operation to obtain the weighted motion vector of the current block.

2. The method for acquiring motion vectors of claim 1, wherein the plurality of related motion vectors further comprise spatial motion vectors; the spatial motion vectors are motion vectors of a spatial related block; the spatial related block belongs to a current frame and is located on an encoded side of the current block; the determining weights of at least part of the plurality of related motion vectors further comprises:
determining the weights of at least part of the plurality of related motion vectors based on at least one of a size of the current block, content characteristics of the current block, and a position of the spatial related block relative to the current block.

3. The method for acquiring motion vectors of claim 2, wherein the calculating the weighted motion vector of the current block based on at least part of the plurality of related motion vectors and the weights of at least part of the plurality of related motion vectors further comprises:

in response to a sum of weights of the spatial motion vectors being equal to 1, the spatial motion vectors and the weights of the same are configured to perform a weighted sum operation to obtain a weighted motion vector of the current block; or, in response to the sum of weights of the spatial motion vectors not being equal to 1, the spatial motion vectors and the weights of the same are configured to perform a weighted average operation to obtain the weighted motion vector of the current block.

4. The method for acquiring motion vectors of claim 2, wherein the determining the weights of at least part of the plurality of related motion vectors based on at least one of a size of the current block, content characteristics of the current block, and a position of the spatial related block relative to the current block comprises:

determining that weights of spatial related blocks located on a left side of the current block are larger than weights of spatial related blocks on an upper side of the current block, in response to a height of the current block being larger than a width of the current block; determining that the weights of the spatial related blocks located on the left side of the current block are equal to the weights of the spatial related blocks on the upper side of the current block, in response to the height of the current block being equal to the width of the current block; determining that the weights of the spatial related blocks located on the left side of the current block are smaller than the weights of the spatial related blocks on the upper side of the current block, in response to the height of the current block being smaller than the width of the current block.

5. The method for acquiring motion vectors of claim 2, wherein the determining the weights of at least part of the plurality of related motion vectors based on at least one of a size of the current block, content characteristics of the current block, and a position of the spatial related block relative to the current block comprises:

determining that the weights of the spatial related blocks located on the left side of the current block are larger than the weights of the spatial related blocks on the upper side of the current block, in response to a rate distortion cost of an intra-fame horizontal mode of the current block being smaller than a rate distortion cost of an intra-fame vertical mode of the current block; determining that the weights of the spatial related blocks located on the left side of the current block are equal to the weights of the spatial related blocks on the upper side of the current block, in response to the rate distortion cost of the intra-fame horizontal mode of the current block being equal to the rate distortion cost of the intra-fame vertical mode of the current block; determining that the weights of the spatial related blocks located on the left side of the current block are smaller than the weights of the spatial related blocks on the upper side of the current block, in response to the rate distortion cost of the intra-fame horizontal mode of the current block being larger than the rate distortion cost of the intra-fame vertical mode of the current block.

6. The method for acquiring motion vectors of claim 2, wherein the determining the weights of at least part of the plurality of related motion vectors based on at least one of a size of the current block, content characteristics of the current block, and a position of the spatial related block relative to the current block comprises:

determining that the weights of the spatial related blocks located on the left side of the current block are larger than the weights of the spatial related blocks on the upper side of the current block, in response to an angle between a texture direction of the current block and a horizontal direction being smaller than an angle between the texture direction of the current block and a vertical direction; determining that the weights of the spatial related blocks located on the left side of the current block are equal to the weights of the spatial related blocks on the upper side of the current block, in response to the angle between the texture direction of the current block and the horizontal direction being equal to the angle between the texture direction of the current block and the vertical direction; determining that the weights of the spatial related blocks located on the left side of the current block smaller than the weights of the spatial related blocks on the upper side of the current block, in response to the angle between the texture direction of the current block and the horizontal direction being larger than the angle between the texture direction of the current block and the vertical direction; and/or, a weight of the spatial related block and a distance of the spatial related block relative to the current block are negatively correlated.

7. The method for acquiring motion vectors of claim 1, wherein the querying the block in which the co-located point is located in the reference frame of the block to be queried corresponding to the point of the block to be queried comprises:

determining the block in which the co-located point is located in the reference frame of the block to be queried corresponding to the point of the block to be queried;

querying an offset co-located point and determining the offset co-located point as the corresponding co-located point in the reference frame of the block to be queried, in response to the type of the block in which the co-located point is located being the same as the type of the block to be queried; wherein the offset co-located point is a point referring to the co-located point after offsetting with an inter-frame block motion vector.

8. The method for acquiring motion vectors of claim 2, wherein in cases of the plurality of related motion vectors comprising the spatial motion vectors and the temporal motion vectors, the calculating the weighted motion vector of the current block based on at least part of the plurality of related motion vectors and the weights of at least part of the plurality of related motion vectors comprises:

calculating a weighted average of the spatial motion vectors to obtain a spatial weighted motion vector based on the spatial motion vectors and weights of the spatial motion vectors; calculating a weighted average of the temporal motion vectors to obtain a temporal weighted motion vector based on the temporal motion vectors and weights of the temporal motion vectors; and calculating a weighted average of the spatial weighted motion vector and the temporal weighted motion vector to obtain a weighted motion vector of the current block.

9. The method for acquiring motion vectors of claim 1, wherein the plurality of related motion vectors further comprise spatial motion vectors; the spatial motion vectors are motion vectors of a spatial related block; the spatial related block belongs to a current frame and is located on an encoded side of the current block; a reference frame of the spatial related block with a largest weight is configured as a reference frame of the current block; a reference frame list of the spatial related block with a largest weight is configured as a reference frame list of the current block; and/or the plurality of related motion vectors comprise the temporal motion vectors, a reference frame in which the temporal related block with a largest weight is located is configured as a reference frame of the current block; a reference frame list of the temporal related block with a largest weight is configured as a reference frame list of the current block.

10. A motion vector-based prediction method, comprising:

obtaining a weighted motion vector of a current block obtained through operations for acquiring motion vectors, comprising:

obtaining a plurality of related motion vectors of a current block, wherein the plurality of related motion vectors are motion vectors of a related block of the current block, a prediction mode of the related block is the same as a current prediction mode of the current block, an encoding has been completed; wherein the plurality of related motion vectors comprise temporal motion vectors; the temporal motion vectors are motion vectors of a temporal related block; the temporal related block does not belong to the current frame; the obtaining the plurality of related motion vectors of the current block comprises:

configuring the current block as a block to be queried;
querying a block in which a co-located point is located in a reference frame of the block to be queried corresponding to a point of the block to be queried;
determining the block in which the co-located point is located as the temporal related block of the current block and configuring the temporal related block as a new block to be queried, in response to a type of the block in which the co-located point is located being the same as a type of the block to be queried; and
repeatedly performing the querying the block in which the co-located point is located in the reference frame of the block to be queried corresponding to the point of the block to be queried, and subsequent operations, until a number of temporal related blocks reaches a preset amount, or the type of the block in which the co-located point is located is different from the type of the block to be queried;

determining weights of at least part of the plurality of related motion vectors, comprising:
determining a weight of the temporal related block based on a distance of the temporal related block relative to the current block; wherein the weight of the temporal related block and the distance of the temporal related block relative to the current block are negatively correlated; and calculating a weighted motion vector of the current block based on at least part of the plurality of related motion vectors and the weights of at least part of the plurality of related motion vectors, comprising:
in response to a sum of weights of the temporal motion vectors being equal to 1, the temporal motion vectors and the weights of the same are configured to perform a weighted sum operation to obtain a weighted motion vector of the current block; or,
in response to the sum of weights of the temporal motion vectors not being equal to 1, the temporal motion vectors and the weights of the same are configured to perform a weighted average operation to obtain the weighted motion vector of the current block;

calculating a first coding cost of the current block based on the weighted motion vector;
calculating a second encoding cost of the current block based on a motion vector different from the weighted motion vector, and
selecting a motion vector corresponding to a smallest one of the first encoding cost and the second encoding cost to obtain a final motion vector of the current block.

11. The motion vector-based prediction method of claim 10, wherein the first coding cost is a rate distortion cost of the weighted motion vector.

12. The motion vector-based prediction method of claim 10, comprising:
encoding the current block based on the final motion vector to obtain a code stream of the current block;
wherein in response to the final motion vector being the weighted motion vector, the code stream of the current block comprises a first syntax element; the first syntax element is configured to indicate that the final motion vector is the weighted motion vector.

13. The motion vector-based prediction method of claim 11, wherein the plurality of related motion vectors further comprise spatial motion vectors; the spatial motion vectors are motion vectors of a spatial related block; the spatial related block belongs to a current frame and is located on an encoded side of the current block, the determining weights of at least part of the plurality of related motion vectors further comprises:
determining the weights of at least part of the plurality of related motion vectors based on at least one of a size of the current block, content characteristics of the current block, and a position of the spatial related block relative to the current block.

14. A device for acquiring motion vectors, comprising a memory and a processor coupled to each other;
wherein the processor is configured to execute program instructions stored in the memory to implement a method for acquiring motion vectors, comprising:
obtaining a plurality of related motion vectors of a current block, wherein the plurality of related motion vectors are motion vectors of a related block of the current block, a prediction mode of the related block is the same as a current prediction mode of the current block, an encoding has been completed; wherein the plurality of related motion vectors comprise temporal motion vectors; the temporal motion vectors are motion vectors of a temporal related block; the temporal related block does not belong to the current frame; the obtaining the plurality of related motion vectors of the current block comprises:
configuring the current block as a block to be queried;
querying a block in which a co-located point is located in a reference frame of the block to be queried corresponding to a point of the block to be queried;
determining the block in which the co-located point is located as the temporal related block of the current block and configuring the temporal related block as a new block to be queried, in response to a type of the block in which the co-located point is located being the same as a type of the block to be queried; and repeatedly performing the querying the block in which the co-located point is located in the reference frame of the block to be queried corresponding to the point of the block to be queried, and subsequent operations, until a number of temporal related blocks reaches a preset amount, or the type of the block in which the co-located point is located is different from the type of the block to be queried;

determining weights of at least part of the plurality of related motion vectors, comprising:

determining a weight of the temporal related block based on a distance of the temporal related block relative to the current block; wherein the weight of the temporal related block and the distance of the temporal related block relative to the current block are negatively correlated; and calculating a weighted motion vector of the current block based on at least part of the plurality of related motion vectors and the weights of at least part of the plurality of related motion vectors, comprising:

in response to a sum of weights of the temporal motion vectors being equal to 1, the temporal motion vectors and the weights of the same are configured to perform a weighted sum operation to obtain a weighted motion vector of the current block; or, in response to the sum of weights of the temporal motion vectors not being equal to 1, the temporal motion vectors and the weights of the same are configured to perform a weighted average operation to obtain the weighted motion vector of the current block.

* * * * *